United States Patent
Kozono et al.

(12) 
(10) Patent No.: US 7,875,395 B2
(45) Date of Patent: Jan. 25, 2011

US007875395B2

(54) NONAQUEOUS ELECTROLYTIC CELL AND ITS MANUFACTURING METHOD

(75) Inventors: Suguru Kozono, Kyoto (JP); Kazusa Yukimoto, Kyoto (JP); Shigeki Yamate, Kyoto (JP); Taro Yamafuku, Kyoto (JP); Yoshihiro Katayama, Kyoto (JP); Atsushi Funabiki, Kyoto (JP); Toshiyuki Nukuda, Kyoto (JP)

(73) Assignee: GS Yuasa Corporation, Kyoto-Shi, Kyoto (JP)

( * ) Notice: Subject to any disclaimer, the term of this patent is extended or adjusted under 35 U.S.C. 154(b) by 91 days.

(21) Appl. No.: 12/310,653

(22) PCT Filed: Aug. 31, 2007

(86) PCT No.: PCT/JP2007/067452

§ 371 (c)(1),
(2), (4) Date: Mar. 3, 2009

(87) PCT Pub. No.: WO2008/029899

PCT Pub. Date: Mar. 13, 2008

(65) Prior Publication Data

US 2010/0178570 A1   Jul. 15, 2010

(30) Foreign Application Priority Data

Sep. 5, 2006 (JP) .............................. 2006-240879
Sep. 5, 2006 (JP) .............................. 2006-240880

(51) Int. Cl.
*H01M 4/58* (2010.01)
*H01M 6/18* (2006.01)

(52) U.S. Cl. .......................... 429/409; 429/408; 429/49

(58) Field of Classification Search .............. 429/231.1, 429/231.5, 231.8, 231.95, 329, 340, 341; *H01M 4/58, H01M 6/18*
See application file for complete search history.

(56) References Cited

U.S. PATENT DOCUMENTS 6,482,550 B1 * 11/2002 Imachi et al. ............... 429/338
2005/0221187 A1 * 10/2005 Inagaki et al. .......... 429/231.95

FOREIGN PATENT DOCUMENTS

| JP | 2004-296256 | 10/2004 |
|----|-------------|---------|
| JP | 2005-209433 | 8/2005 |
| JP | 2006-066341 | 3/2006 |

OTHER PUBLICATIONS

English translation of Kawamoto (JP2000-348725).*

* cited by examiner

*Primary Examiner*—Melvin C Mayes
*Assistant Examiner*—Jun Li
(74) *Attorney, Agent, or Firm*—Manabu Kanesaka

(57) ABSTRACT

A nonaqueous electrolytic cell manufacturing method is characterized in that a nonaqueous electrolyte containing vinylene carbonate is used, a coating on the surface of the negative electrode is formed at the initial charging/discharging in such a way by lowering the negative electrode potential to less than 0.4 V with relative to the lithium potential, wherein the nonaqueous electrolytic cell comprises a nonaqueous electrolyte containing an electrolytic salt and a nonaqueous solvent, a positive electrode, and a negative electrode containing a negative electrode material into/from which lithium ions are inserted/desorbed at a potential higher than the lithium potential by 1.2 V. The nonaqueous electrolytic cell is used in a range of negative electrode potential nobler than the lithium potential by 0.8 V.

14 Claims, No Drawings

NONAQUEOUS ELECTROLYTIC CELL AND ITS MANUFACTURING METHOD

TECHNICAL FIELD

The present invention relates to a nonaqueous electrolytic cell with suppressed gas generation and little volume change, particularly a nonaqueous electrolytic cell with suppressed gas generation at the time of high temperature storage, and its manufacturing method.

BACKGROUND ART

Today, nonaqueous electrolytic cells represented by lithium secondary batteries have been employed widely for consumers use such as small-sized portable appliances as nonaqueous electrolytic cell with high energy density. Recently, for new uses, it has been expected to manufacture middle-sized and large-sized nonaqueous electrolytic cells and apply them as electric power storage facilities and motive energy for vehicle such as HEV.

In manufacturing middle-sized and large-sized nonaqueous electrolytic cells, high reliability is required. In general, for a nonaqueous electrolytic cell, a positive electrode using a transition metal oxide as a positive active material, a negative electrode using a carbon material as a negative active material, and a nonaqueous electrolyte containing an electrolytic salt such as $LiPF_6$ dissolved in a nonaqueous solvent such as carbonate are used, and since insertion/extraction reaction of lithium ion into/from the carbon material of the negative electrode is mainly caused at a less potential than the reduction decomposition potential of the nonaqueous electrolyte, although the energy density is heightened, there is contrarily a weak point in terms of the reliability such as the life or high temperature property.

In hope of improvement of the reliability, proposed is a nonaqueous electrolytic cell using lithium titanate as a negative active material into/from which insertion/extraction reaction of lithium ion is cause at a nobler potential (around 1.5 V) as compared with a carbon material. However, when lithium titanate is used as a negative active material, in the initial charge-discharge process during the manufacturing step, gas generation is caused mainly due to reaction of lithium titanate and a nonaqueous solvent. If the gas generation reaction is caused, the power characteristic and life characteristic of the cell are worsened because of the characteristic change of the electrode surface due to the decomposition reaction of the liquid electrolyte and change of the physical property and the amount of the liquid electrolyte. Further, it becomes a cause of the cell swelling.

It is unfavorable for a nonaqueous electrolytic cell to be penetrated with water in the inside, and therefore, in the manufacturing step, a huge installation investment is required to keep a container being left in opened state for a long time without being closed after a nonaqueous liquid electrolyte filling into the container and it is not practical, and thus tight sealing is strongly required immediately after the nonaqueous liquid electrolyte filling.

Nonaqueous electrolytic cells using lithium titanate as a negative active material is currently commercialized as products mainly for back up use (e.g., reference to Non-patent Documents 1 and 2, coin-type lithium secondary cell (Sony)) and they are coin type cells having a capacity at most about 20 mAh and the maximum current of about 0.5 ItA. With respect to coin type cells with a small capacity, because, for example, containers are strong, the gas generation during the manufacturing step does not become a big issue. However, in a case of manufacturing a middle-sized, large-sized, and large capacity nonaqueous electrolytic cells using lithium titanate as a negative active material, the gas generation becomes a problem which is nonnegligible. The reasons for that are because the installation investment scale becomes high in the case a section where the open state is kept after the nonaqueous liquid electrolyte filling exists in the manufacturing line; because the container tends to be susceptive to swelling along with the enlargement of the surface area of the container; because the container also tends to be susceptive to swelling due to increase of the equilibrium point of the internal pressure in a case a resin sealing agent which can permeate some of gases is used; and so forth. Herein, middle sized, large-sized, and large capacity cells means cells with 10 mAh or higher, preferably 100 mAh or higher, and more preferably 200 mAh or higher.

Non-patent Document 1: Journal of Power Sources 146 (2005) 636-639

Non-patent Document 2: Shingakugiho EE2005-50 CPM2005-174

As a method for moderating the effect of swelling or the like due to gas generation in middle-sized and large-sized cells, a method of keeping a large dead space in cells can be exemplified; however such a cell design is contradictory to the designing concept of high energy density cells. From this viewpoint, it is proper to keep the dead space calculated by subtracting the volume of the solid matter and liquids such as a power generating element, an electrode element, and a liquid electrolyte from the internal content of a container to 35% by volume or less.

With respect to middle-sized, large-sized, and high capacity nonaqueous electrolytic cells using lithium titanate as a negative active material, it has been required to develop techniques of not only suppressing gas generation in the initial charge-discharge step carried out in the manufacturing step but also suppressing gas generation of cells after completion, particularly gas generation at the time of high temperature storage and thereby suppressing swelling in a nonaqueous electrolytic cell.

Since gas is generated in the electrode surface, it is apparent that the problem can be solved if an ideal coat is formed on the electrode surface; however, any conventional techniques cannot accomplish formation of the ideal coat. For example, if a firm coat of polyethylene is formed on the electrode surface, hydrogen gas generation can almost completely be suppressed; however the electrode reaction is significantly inhibited and the cell performance is thus extremely worsened. As described, the ideal coat should not be so vainly dense or vainly thick as to inhibit electrode reaction and is required not to increase the thickness or disintegrate or generate hydrogen gas or other gases.

Various means for suppressing gas generation in nonaqueous electrolytic cells using lithium titanate as a negative active material have been proposed. For example, Patent Document 1 proposes optimization of a carbonaceous material being an electric conductive agent. Further, Patent Document 2 proposes use of a nonstoichiometric titanium oxide as an electric conductive agent. Furthermore, Patent Document 1 describes "examples of the organic solvent may include cyclic carbonates such as ethylene carbonate (EC), propylene carbonate (PC), and vinylene carbonate (VC); linear carbonates such as dimethyl carbonate (DMC), methyl ethyl carbonate (MEC), and diethyl carbonate (DEC); cyclic ethers such as tetrahydrofuran (THF) and 2-methyltetrahydrofuran (2MeTHF); linear ethers such as dimethoxyethane (DME); γ-butyrolactone (BL), acetonitrile (AN), and sulfolane (SL)" (paragraph 0032), and Patent Document 2 also describes the same (paragraph 0062); however specifically, only "a solvent mixture of ethylene carbonate (EC) and γ-butyrolactone (BL)" (volume ratio 25:75) (paragraph 0053 in Patent Document 1 and 0074 in Patent Document 2) is disclosed and use of vinylene carbonate is neither specifically described nor formation of a coat on negative electrode surface and therefore, it is not easy for a person skilled in the art to form a coat on the negative electrode surface by using a nonaqueous electrolyte containing vinylene carbonate on the basis of Patent Documents 1 and 2.

Patent Document 1: Japanese Patent Application Laid-Open (JP-A) No. 2005-100770

Patent Document 2: JP-A No. 2005-332684

Patent Document 3 describes "lithium titanate and diethylene glycol dimethyl ether are reacted by using a negative electrode containing lithium titanate as an active material and a nonaqueous liquid electrolyte containing diethylene glycol dimethyl ether to form an ion conductive coat on the surface of lithium titanate of the negative electrode. It is considered that the storage property of a lithium secondary cell of this invention is improved by suppressing reaction of lithium titanate, which is an active material, with the nonaqueous liquid electrolyte" (paragraph 0006) and thus shows a technical idea to form the coat and improve the storage property by using solvent decomposed at a relatively nobler potential at which lithium titanate acts at the same time. Further, also disclosed is the lithium secondary cell in which the solvent of the liquid electrolyte comprises a solvent mixture of propylene carbonate and diethylene glycol dimethyl ether (claim 3). However, as shown in Examples of present description, even if the solvent mixture of propylene carbonate and diethylene glycol dimethyl ether is used, the gas generation and cell swelling cannot be suppressed sufficiently.

Patent Document 3: JP-A No. 2004-95325

Patent Document 4 proposes improvement of the cycle performance and storage characteristics by using a separator containing mainly polyphenylene sulfide or polyether ether ketone. Further, Patent Document 5 proposes improvement of the cycle life by using fluorinated lithium-containing titanium oxide. Moreover, Patent Document 4 describes "since polyphenylene sulfide (PPS) or polyether ether ketone (PEEK), main materials of the separator, are excellent in the chemical stability, reaction with lithium titanate or titanium oxide having high reduction ability is scarcely caused. In addition, cyclic carbonates and linear carbonates which are nonaqueous solvents form chemically stable coat on the negative electrode surface by reaction with lithium titanate or the like. Accordingly, deterioration of cell performance due to reaction of the separator with lithium titanate or titanium oxide during storing cell can be prevented" (paragraph 0009) and "examples of the cyclic carbonates include ethylene carbonate, propylene carbonate, butylene carbonate, and vinylene carbonate and examples of the linear carbonates include dimethyl carbonate, ethyl methyl carbonate, and diethyl carbonate" (paragraph 0011); however use of vinylene carbonate as a cyclic carbonate is not specifically described (reference to Table 3) and further only the capacity retention ratios after storage are shown but suppression of gas generation at the time of storage is not referred to and therefore on the basis of the descriptions of Patent Documents 4 and 5, it cannot be said that a person skilled in the art could have easily achieved the suppression of gas generation at the time of storage by previously forming the coat on the negative electrode surface by using a nonaqueous liquid electrolyte containing vinylene carbonate.

Patent Document 4: JP-A No. 2004-87229

Patent Document 5: JP-A No. 2005-302601

Patent Document 6 describes "there is no problem to use a nonaqueous electrolyte secondary cell comprising lithium titanate as a negative active material as a main power supply for portable appliances; however there occurs a problem of cell performance deterioration in the case of using this nonaqueous electrolyte secondary cell as a power supply for memory back up at operating voltage of around 3.0 V. The reason for that is because when such a nonaqueous electrolyte secondary cell is used as a main power supply of portable appliances, the negative electrode is charged up to around 0.1 V on the basis of lithium metal at the time of charging, and therefore, a coat excellent in ion conductivity is formed on the surface of the negative electrode, reaction of the negative electrode and the nonaqueous liquid electrolyte is suppressed due to the coat, and thus decomposition of the nonaqueous liquid electrolyte and breakage of the negative electrode structure can be prevented. On the other hand, when this nonaqueous electrolyte secondary cell is used as a power supply for memory back up at operating voltage of around 3.0 V, charging with very small current about 1 to 5 μA is carried out while the constant voltage state around 3.0 V is kept for a long time and charging of the negative electrode is carried out up to only about 0.8 V on the basis of lithium metal and therefore, the coat is not formed on the surface of the negative electrode and thus the negative electrode and the nonaqueous liquid electrolyte are reacted to decompose the nonaqueous liquid electrolyte or break the negative electrode structure" (reference to paragraphs 0006 and 0007) and thus it is described that when the nonaqueous electrolyte secondary cell using lithium titanate as the negative active material is charged up to around 0.1 V on the basis of lithium metal, the reaction of the negative electrode and the nonaqueous liquid electrolyte can be suppressed due to the coat formed on the surface of the negative electrode; however, it is not described about use of the cell having the coat on the negative electrode surface charged up to around 0.1 V in a range of negative electrode potential nobler than the lithium potential by 0.8 V and contrarily, according to description of Patent Document 6, the cell to be used in a range of negative electrode potential nobler than the lithium potential by 0.8 V is assumed to have no coat on the negative electrode surface and accordingly, use of the cell having the coat on the negative electrode surface in a range of negative electrode potential nobler than the lithium potential by 0.8V is rather inhibited and therefore a person skilled in the art could have easily achieved the use. Further, as below-described in Examples of the present description, in the case of using the cell having the coat on the negative electrode surface in a range of negative electrode potential around 0.2 V relatively to the lithium potential, suppression of gas generation and suppression of cell swelling are insufficient and therefore, it could not be expected that gas generation and cell swelling are remarkably suppressed by using the cell having the coat on the negative electrode surface in a range of negative electrode potential nobler than the lithium potential by 0.8 V.

Patent Document 6: JP-A No. 2005-317509

Further, there is a description in same document as "with respect to the nonaqueous electrolyte secondary cell of the invention, as the nonaqueous solvent to be used for the nonaqueous electrolyte, generally employed and known nonaqueous solvents can be used and particularly, solvent mixtures obtained by mixing cyclic carbonates and linear carbonates are preferably used. Herein, examples of the cyclic carbonates include ethylene carbonate, propylene carbonate, butylene carbonate, and vinylene carbonate. Examples of the linear carbonates include dimethyl carbonate, methyl ethyl carbonate, and diethyl carbonate. Further, as the nonaqueous solvent, γ-butyrolactone and solvent mixtures obtained by mixing γ-butyrolactone and cyclic carbonates can be also used. Since the cyclic carbonates are generally easy to be decomposed at a high potential, the ratio of the cyclic carbonates in the nonaqueous solvent is preferably in a range of 10 to 50% by volume and more preferably in a range of 10 to 30% by volume. In the case of using ethylene carbonate as a cyclic carbonate, the storage property is excellent" (paragraph 25); however as described "in the case of using a lithium transition metal composite oxide defined by a general formula $LiMn_xNi_yCo_zO_2$ (x+y+z=1; 0≦x≦0.5; 0≦y≦1; 0≦z≦1) is used as the positive active material in the positive electrode, if the weight ratio of the negative active material to the positive active material is set to 0.57 or higher and 0.95 or lower, the voltage at the time of finishing charging in the negative electrode is around 0.8 V on the basis of lithium metal when the charging is carried out while keeping constant voltage state at around 3.0 V, and it is thus suppressed that the nonaqueous liquid electrolyte is decomposed because of reaction with the negative electrode or the negative electrode structure is broken . . . " (paragraph 0022) and accordingly since "the voltage at the time of finishing charging in the negative electrode is around 0.8 V on the basis of lithium metal", no coat is formed on the surface of the negative electrode in accordance with the description in paragraph 0007 of the same Document and it cannot be said that a person skilled in the art could have easily achieved the suppression of gas generation by forming the coat on the negative electrode surface by using a nonaqueous electrolyte containing a cyclic carbonate such as "ethylene carbonate, propylene carbonate, butylene carbonate, and vinylene carbonate" on the basis of the description of the same Document.

Patent Document 7 discloses that the conductivity of an electrode containing $Li_{4/3}Ti_{5/3}O_4$ is improved by adding a compound having S=O bond such as propane sultone or ethylene sulfide in order to improve the high load discharge characteristics of a nonaqueous electrolyte secondary cell using a lithium titanium compound as a negative active material. However, as shown in Examples of the present description, even if propane sultone (1,3-propane sultone) is added alone to the nonaqueous electrolyte, gas generation or cell swelling cannot be suppressed sufficiently.

Patent Document 7: JP-A No. 2003-163029

Furthermore, aiming suppression of gas generation due to decomposition of propylene carbonate occurring in the case of using propylene carbonate for a nonaqueous electrolyte in a nonaqueous electrolytic cell having a negative electrode of a carbon material, many proposals of adding various kinds of additives have been made (e.g. reference to Patent Document 8).

Patent Document 8: JP-A No. 2005-11768

Patent Document 9 also discloses an invention, "a lithium secondary cell comprising a positive electrode using a composite metal compound of lithium and at least one metal selected from a group consisting of chromium, vanadium, manganese, iron, cobalt and nickel as positive electrode material, a negative electrode using a carbon material as a negative electrode material, and a liquid electrolyte obtained by dissolving an electrolyte in a nonaqueous solvent, wherein the nonaqueous solvent contains not less than 10 wt. % and not more than 60 wt. % of propylene carbonate, not less than 30 wt. % and not more than 80 wt. % of at least one or more linear carbonates selected from methyl ethyl carbonate, methyl propyl carbonate, and methyl butyl carbonate, and not less than 0.01 wt. % and not more than 5 wt. % of vinylene carbonate (VC)" (claim 1); however this invention aims to solve a problem "with respect to a PC type liquid electrolyte in a lithium secondary cell using graphite with high crystallinity as a negative electrode material, it is disadvantageous that PC in the liquid electrolyte is decomposed by graphite during charging and thus fails to obtain good cycle performance" (paragraph 0003) and also there is a description "the invention is accomplished based on the unexpected fact that a liquid electrolyte obtained by selecting PC (freezing point −55° C.) having rather much lower freezing point than those of EC and VC as a high dielectric constant solvent and dissolving an electrolyte in a nonaqueous solvent of a linear carbonate with further low viscosity and VC does not cause PC decomposition even in the case of graphite negative electrode and shows remarkably excellent cell performance even at a low temperature" (paragraph 7) and therefore, the nonaqueous solvent is employed to solve the particular problem for a nonaqueous electrolytic cell using a carbon material for the negative electrode (the aim for suppressing cell swelling is not described) and it is not suggested to apply the nonaqueous solvent to a nonaqueous electrolytic cell using a material other than a carbon material for a negative electrode.

Patent Document 9: Japanese patent No. 3632389

Further, Patent Document 10 discloses an invention "a nonaqueous electrolytic cell comprising a rolled flat type power generating element having a positive electrode, a separator, and a negative electrode containing a carbon material as well as a liquid electrolyte in a cell case made of a metal-laminated resin sheet, wherein a solvent of the liquid electrolyte is a solvent mixture of vinylene carbonate, propylene carbonate, and a linear carbonic acid ester and satisfies the expression: 10≦(A+B)≦50 (wherein A≠0 and B≠0) and 3≦A≦20, wherein A denotes the composition ratio by vol. % of the vinylene carbonate to the total solvent and B denotes the composition ratio by vol. % of the propylene carbonate to the total solvent" (claim 1) and this invention aims to solve a problem "as compared with those made of conventionally used metals and having high rigidity, the laminate case is weak to the outer force and tends to be deformed. Therefore, particularly in the case of standstill at a high temperature, excess gas is generated in the cell due to vaporization of the liquid electrolyte or electrochemical decomposition or thermal decomposition of the liquid electrolyte by oxidation or reduction of the positive electrode/negative electrode active material surface, and accordingly the cell using the laminate case is expanded and deformed due to increase of cell internal pressure" (paragraph 0005), and there are descriptions "on the other hand, since lithium type cell can obtain high voltage, it is desirable to select a liquid electrolyte excellent in the withstand voltage characteristics and propylene carbonate can be exemplified as its candidate, however in the case a carbon material is used for the negative electrode, propylene carbonate is decomposed. Accordingly, for the liquid electrolyte of the nonaqueous electrolytic cell using the carbon material for the negative electrode, use of propylene carbonate is improper although it is advantageous as the liquid electrolyte" (paragraph 0006), and "in above-mentioned Examples, although graphite is used as a substance absorbing and desorbing lithium, which is a negative electrode material, the negative electrode material is not limited thereto, but any carbon materials can be used as the negative electrode material as long as they are capable of absorbing and desorbing lithium" (paragraph 0063), and all the same, the solvent mixture is employed to solve the particular problem for the nonaqueous electrolytic cell using a carbon material for the negative electrode and it is not suggested to apply the solvent mixtures to a nonaqueous electrolytic cell using a material other than a carbon material for a negative electrode.

Further, this invention cannot suppress swelling in the nonaqueous electrolytic cell when the total content of vinylene carbonate and propylene carbonate (all cyclic carbonic acid esters) is higher than the content of the linear carbonic acid esters by vol. % and the content of vinylene carbonate is less than 3 vol. % (see Table 1 to Table 4), and therefore, only very limited solvent mixtures has to be used.

Patent Document 10: Japanese Patent No. 3410027

Although formation of a coat on the surface of the negative electrode using a carbon material is not described in Patent Documents 9 and 10, and according to the following description of Patent Document 11, even if it is apparent that a coat is to be formed on the negative electrode surface in the case of using a carbon material as a negative active material; it cannot be said that a coat is to be formed on the negative electrode surface in the case of using lithium titanate as a negative active material.

That is, Patent Document 11 describes: "it is found that the nonaqueous electrolyte secondary cell using lithium titanate as a negative active material and a carbonaceous material as a conductive agent is inferior in various high temperature characteristics such as high temperature storage characteristics, and high temperature cycle performance since reaction of the carbonaceous material and the liquid electrolyte is caused in high temperature environments and a large quantity of gas is generated. However, in the case of the nonaqueous electrolyte secondary cell using a carbon material which absorbs and desorbs lithium for the negative active material, such problems are not caused. As a result of comparison of both cells, the following is understood. In the charge-discharge cycle, when the negative active material contains a carbon material, the surface of the carbon material is covered with the coat, whereas when the negative active material contains lithium titanate, the surfaces of the lithium titanate and the carbonaceous material are not covered with the coat. Accordingly, it is considered that the coat suppresses the gas generation due to the reaction of the carbon material and the liquid electrolyte. The coat is formed at a negative electrode potential of about 0.8 V or lower to the potential of Li metal (hereinafter, the potential is a value to the potential of Li metal unless otherwise specified) and a particularly good coat is formed at a negative electrode potential of about 0.4 or higher and 0.5 V or lower. The range of the Li absorbing and desorbing potential of the carbon material absorbing and desorbing lithium is about 0.1 V or higher and about 0.9 V or lower and the negative electrode potential is lowered close to 0.1 V at the time of initial charging. Therefore, at the negative electrode potential of about 0.8 V or lower, the coat is formed by reaction of the carbon material and the liquid electrolyte and thereafter, the carbon material can exist stably. On the other hand, the Li absorbing and desorbing potential of lithium titanate is in a range of about 1.3 V or higher to about 3.0 or lower and it is considered that no coat is formed. Accordingly, in the case of a negative active material which has the Li absorbing and desorbing potential nobler than the potential of lithium metal by 1 V, represented by lithium titanate, no coat is formed on the surface and thus gas generation due to reaction of the carbonaceous material which is a conductive agent with the nonaqueous electrolyte cannot be suppressed" (paragraphs 0014 to 0017), and therefore, even if the nonaqueous liquid electrolytes described in Patent Documents 9 and 10 are employed, it is not recognized that the coat is formed on the negative electrode surface when a negative active material such as lithium titanate into/from which lithium ion is inserted/extracted at 1.2 V or higher potential to the lithium potential is used. Accordingly, it cannot be said that a person skilled in the art could have easily achieved application of the nonaqueous liquid electrolytes described in Patent Documents 9 and 10 to the nonaqueous electrolytic cell using a negative active material such as lithium titanate in order to form the coat on the negative electrode surface and suppress the gas generation.

Patent Document 11: JP-A No. 2005-317508

As described in Patent Document 11 as, "the inventors of the invention have made various investigations and accordingly have found that a good coat excellent in ion conductivity can be formed on the negative electrode surface and thus a nonaqueous electrolyte secondary cell excellent in high temperature characteristics and high current characteristics can be realized by providing a negative electrode containing lithium titanate and a carbonaceous material as well as a nonaqueous electrolyte containing a linear sulfite" (paragraph 0018), the coat is formed, by chance, on the negative electrode surface using lithium titanate as a negative active material by containing a linear sulfite in the nonaqueous electrolyte; however as shown in Examples in the present description (Comparative Example in which diethyl sulfite, a linear sulfite, is contained), the gas generation or cell swelling cannot be suppressed sufficiently only by forming the coat on the negative electrode surface.

Patent Document 12 describes a nonaqueous electrolytic cell using graphite as a negative active material (paragraphs 0037 to 0039) and as described there as "with respect to evaluation cells A1 and A2 according to the invention, since lithium-bis(oxalato)borate having reduction potential of about 1.6 to 1.7 V is used, it is considered that the good coat with high lithium ion permeability has been formed on the negative electrode surface before the phosphoric acid ester compound having reduction potential of about 1 V is reduced. Accordingly, it is considered that reduction of the phosphoric acid ester compound is suppressed and the charge/discharge efficiency is improved" (paragraph 0049); "with respect to evaluation cells X1 and X2 for comparison, no lithium-bis (oxalato)borate is contained in the liquid electrolyte and VC is added. The reduction potential of VC is about 0.9 V. Accordingly, it is considered that before a good coat is formed on the negative electrode surface by reaction of VC with the negative electrode, reduction of the phosphoric acid ester compound having reduction potential of about 1 V has started and as a result, the respective initial charge/discharge efficiencies are lowered as compared with those of the cells A1 and A2 containing lithium-bis(oxalato)borate in the liquid electrolytes" (paragraph 0050), the trial to improve the charge-discharge efficiency by forming a good coat on the negative electrode surface by reduction decomposition of an additive is known well and that the reduction potential of VC is about 0.9 V is also known well. However, with respect to the lithium titanate negative electrode, since the operating potential is 1.2 V or higher and generally the negative electrode potential never becomes 0.9 V or lower, it has not been considered to select VC having reduction potential of about 0.9 V as known well as an additive in order to form a coat on the negative electrode surface in a nonaqueous electrolytic cell comprising a lithium titanate negative electrode.

Patent Document 12: JP-A No. 2005-259592

As being understood from Examples of Patent Documents 1, 2, 11, and the like, aluminum is conventionally employed for a current collector of a lithium titanate negative electrode, but it is known well that aluminum is alloyed with lithium at a potential of 0.4 V or lower, therefore there has been no idea to carry out deep charging to 0.4 V or lower of the negative electrode potential for such a cell.

DISCLOSURE OF THE INVENTION

Problems to be Solved by the Invention

In view of the above state of the art, the invention aims to suppress gas generation of a nonaqueous electrolytic cell having a negative electrode containing a negative active material such as lithium titanate into/from which lithium ion is inserted/extracted at a potential of 1.2 V or higher than the lithium potential, and particularly suppress the gas generation at the time of high temperature storage and swelling in the nonaqueous electrolytic cell.

Means for Solving the Problems

The present inventors have made investigations to solve the problems and accordingly have found that in order to suppress gas generation which is a cause of swelling in a nonaqueous electrolytic cell having a negative electrode having a negative active material such as lithium titanate, a coat is formed on the negative electrode surface by using a nonaqueous electrolyte containing a certain additive, VC, and when the nonaqueous electrolytic cell is used in a region of negative electrode potential nobler than the lithium potential by 0.8 V, the gas generation at the time of high temperature storage can be suppressed by the coat, and these findings have now led to completion of the invention.

As described above, the operating potential of the lithium titanate negative electrode is 1.2 V or higher and generally the negative electrode potential never becomes 0.9 V or lower, and therefore in a nonaqueous electrolytic cell having a lithium titanate negative electrode, although there has been no idea to select VC having a reduction potential of about 0.9 V as an additive in order to form a coat on the negative electrode surface, the present inventors have tried to carry out experiments and accordingly have found that a coat is formed on the negative electrode surface by using VC in the nonaqueous electrolytic cell having the lithium titanate negative electrode (even in the case of carrying out no operation of setting the negative electrode potential to as base as 0.9 V or lower) and surprisingly a significant effect of gas generation suppression in the nonaqueous electrolytic cell is obtained.

To solve the problems, the present invention employs the following means:

(1) a nonaqueous electrolytic cell having a nonaqueous electrolyte containing an electrolyte salt and a nonaqueous solvent, a positive electrode, and a negative electrode containing a negative active material into/from which lithium ion is inserted/extracted at 1.2 V or higher potential than lithium potential, wherein the nonaqueous electrolyte contains vinylene carbonate, the negative electrode bears a coat on the surface thereof, and the cell is used in a range of a negative electrode potential nobler than lithium potential by 0.8 V;

(2) the nonaqueous electrolytic cell according to (1), wherein the nonaqueous electrolyte further contains 1,3-propane sultone;

(3) the nonaqueous electrolytic cell according to (1) or (2), wherein the nonaqueous solvent contains a cyclic carbonate other than vinylene carbonate and a linear carbonate;

(4) the nonaqueous electrolytic cell according to (3), wherein the cyclic carbonate is propylene carbonate and the linear carbonate is diethyl carbonate;

(5) the nonaqueous electrolytic cell according to any one of (1) to (4), wherein the content of the vinylene carbonate is 10% by weight or less to that of the nonaqueous electrolyte;

(6) the nonaqueous electrolytic cell according to (5), wherein the content of the vinylene carbonate is 0.5 to 5% by weight to that of the nonaqueous electrolyte;

(7) the nonaqueous electrolytic cell according to any one of (1) to (6), wherein the thickness of the coat on the negative electrode surface is 10 nm or more;

(8) the nonaqueous electrolytic cell according to any one of (1) to (7), wherein the negative active material is a spinel type lithium titanate;

(9) the nonaqueous electrolytic cell according to any one of (1) to (8), wherein a positive active material is a lithium-transition metal composite oxide defined by a general formula $LiMn_xNi_yCo_zO_2$ ($x+y+z=1$; $0 \leq x \leq 0.5$; $0 \leq y \leq 1$; $0 \leq z \leq 1$);

(10) the nonaqueous electrolytic cell according to any one of (1) to (9), wherein a current collector of the negative electrode is of copper, nickel, or their alloy;

(11) the nonaqueous electrolytic cell according to any one of (1) to (10), wherein in an internal gas in the nonaqueous electrolytic cell after the cell is left at 60° C. for 2 weeks, a ratio of the total volume of methane, ethylene, and ethane to the total volume of hydrogen, carbon dioxide, methane, ethylene, and ethane is less than 0.3%, and a ratio of the carbon dioxide volume to the cell capacity is less than 0.4 μl/mAh;

(12) a method for manufacturing a nonaqueous electrolytic cell having a nonaqueous electrolyte containing an electrolyte salt and a nonaqueous solvent, a positive electrode, and a negative electrode containing a negative active material into/from which lithium ion is inserted/extracted at 1.2 V or higher potential than lithium potential, wherein a vinylene carbonate-containing nonaqueous electrolyte is used and the initial charge-discharge is carried out in condition that the negative electrode potential at finishing charging exceeds 0.8 V to lithium potential to form a coat on the negative electrode surface;

(13) a method for manufacturing a nonaqueous electrolytic cell having a nonaqueous electrolyte containing an electrolyte salt and a nonaqueous solvent, a positive electrode, and a negative electrode containing a negative active material into/from which lithium ion is inserted/extracted at 1.2 V or higher potential than lithium potential, wherein a vinylene carbonate-containing nonaqueous electrolyte is used and at the time of initial charge-discharge, the negative electrode potential is lowered to 0.4 V or less, i.e. within 0.4 V, relative to lithium potential to form a coat on the negative electrode surface;

(14) the method for manufacturing a nonaqueous electrolytic cell according to (13), wherein the negative electrode potential is lowered to 0.4 V or less to lithium potential by making the charge voltage at the time of initial charge-discharge higher than that in use;

(15) the method for manufacturing a nonaqueous electrolytic cell according to (14), wherein even in a region where the negative electrode potential is 0.4 V or less to lithium potential, the positive electrode potential does not exceed 4.5 V to the lithium potential in the entire region where being 0.4 V or less;

(16) the method for manufacturing a nonaqueous electrolytic cell according to any one of (12) to (15), wherein a nonaqueous electrolyte further containing 1,3-propane sultone is used at the time of initial charge-discharge;

(17) the method for manufacturing a nonaqueous electrolytic cell according to any one of (12) to (16), wherein the nonaqueous solvent contains a cyclic carbonate other than vinylene carbonate and a linear carbonate;

(18) the method for manufacturing a nonaqueous electrolytic cell according to (17), wherein the cyclic carbonate is propylene carbonate and the linear carbonate is diethyl carbonate;

(19) the method for manufacturing a nonaqueous electrolytic cell according to any one of (12) to (18), wherein the content of the vinylene carbonate is 10% by weight or less to that of the nonaqueous electrolyte;

(20) the method for manufacturing a nonaqueous electrolytic cell according to (19), wherein the content of the vinylene carbonate is 0.5 to 5% by weight to that of the nonaqueous electrolyte;

(21) the method for manufacturing a nonaqueous electrolytic cell according to any one of (12) to (20), wherein the thickness of the coat of the negative electrode surface is 10 nm or more; and

(22) the method for manufacturing a nonaqueous electrolytic cell according to any one of (12) to (21), wherein the negative active material is a spinel type lithium titanate.

Additionally, in (12), (13), (14), and (16), "initial charge-discharge" means charge-discharge carried out in the manufacturing step of the nonaqueous electrolytic cell.

EFFECTS OF THE INVENTION

According to the present invention, vinylene carbonate is contained in a nonaqueous electrolyte of a nonaqueous electrolytic cell having a negative electrode containing a negative active material such as lithium titanate into/from which lithium ion is inserted/extracted at 1.2 V or higher potential than lithium potential, and a coat is made to exist on the negative electrode surface, so that when the cell is used in a region of negative electrode potential nobler than lithium potential by 0.8 V, there are effects to suppress gas generation, to suppress gas generation particularly in the case of high temperature storage, and to suppress swelling in the nonaqueous electrolytic cell.

BEST MODES TO CARRYING OUT THE INVENTION

Examples of the negative active material to be used as a main component of the negative electrode which a nonaqueous electrolytic cell of the present invention has include those into/from which lithium ion can be inserted/extracted at 1.2 V or higher potential to lithium potential. For example, tungsten oxide, molybdenum oxide, iron sulfide, titanium sulfide, lithium titanate, and the like can be used. Particularly, lithium titanate having a spinel type structure defined by a chemical formula $Li_{4+x}Ti_5O_{12}$ ($0 \leq x \leq 3$) is preferable. Examples of the conductive agent can include acetylene black, carbon black, and graphite. Examples of the binder can include polytetrafluoroethylene (PTFE), poly(vinylidene fluoride), and fluoro type rubber.

The positive active material to be used for the positive electrode which a nonaqueous electrolytic cell of the present invention has is not particularly limited and examples thereof can include various kinds of oxides, sulfides, and the like. Examples thereof include manganese dioxide ($MnO_2$), iron oxide, copper oxide, nickel oxide, lithium manganese composite oxide (e.g. $Li_xMn_2O_4$ or $Li_xMnO_2$), lithium nickel composite oxide (e.g. $Li_xCoO_2$), lithium cobalt composite oxide ($Li_xCoO_2$), lithium nickel cobalt composite oxide (e.g. $LiNi_{1-y}Co_yO_2$), lithium nickel cobalt manganese composite oxide (e.g. $LiNi_xCo_yMn_{1-y-z}O_2$), spinel type lithium manganese nickel composite oxide (e.g. $Li_xMn_{2-y}Ni_yO_4$), lithium phosphorus oxide having olivine structure (e.g. $Li_xFePO_4$, $Li_xFe_{1-y}Mn_yPO_4$, and $Li_xCoPO_4$), iron sulfate ($Fe_2(SO_4)_3$), and vanadium oxide (e.g. $V_2O_5$). Additional examples can also include organic materials and inorganic materials such as conductive polymers, e.g. polyaniline and polypyrrole; disulfide type polymer materials, sulfur (S), and carbon fluoride. Particularly, lithium-transition metal composite oxide defined by a general formula $LiMn_xNi_yCo_zO_2$ ($x+y+z=1$; $0 \leq x \leq 0.5$; $0 \leq y \leq 1$; $0 \leq z \leq 1$) is preferable.

Well known conductive materials and binders can be applied to the positive electrode in a well known manner and contained therein. Examples of the conductive agent can include acetylene black, carbon black, and graphite. Examples of the binder can include polytetrafluoroethylene (PTFE), poly(vinylidene fluoride), and fluoro type rubber. For the positive electrode current collector, a well known material may be used in a well known method. For example, aluminum or aluminum alloys can be exemplified.

Examples of the separator can include a porous film, a nonwoven fabric of synthetic resin containing polyethylene, polypropylene, cellulose, or poly(vinylidene fluoride) (PVdF).

Examples of the supporting electrolyte can include lithium perchlorate ($LiClO_4$), lithium hexafluorophosphate ($LiPF_6$), lithium tetrafluoroborate ($LiBF_4$), lithium arsenic hexafluoride ($LiAsF_6$), lithium trifluoromethanesulfonate ($LiCF_3SO_3$), and bistrifluoromethylsulfonylimide lithium [$LiN(CF_3SO_2)_2$].

In the present invention, as the nonaqueous solvent, for example, a cyclic carbonate such as ethylene carbonate (EC) and propylene carbonate (PC) is preferably contained. As described below, in the present invention, separately from the cyclic carbonate as a nonaqueous solvent, vinylene carbonate, which is a cyclic carbonate having carbon-carbon double bond in the ring, is essentially contained. Further, together with the cyclic carbon, a linear carbonate such as dimethyl carbonate (DMC), methyl ethyl carbonate (MEC), and diethyl carbonate (DEC) is preferably contained. The mixing ratio of the cyclic carbonate and the linear carbonate as a nonaqueous solvent is not particularly limited; however (cyclic carbonate:linear carbonate) may be in a range of (7:3) to (3:7). Additionally, a cyclic ether such as tetrahydrofuran (THF) and 2-methyltetrahydrofuran (2Me THF); a linear ether such as dimethoxyethane (DME); γ-butyrolactone (GBL), acetonitrile (AN), sulfolane (SL), and the like may be used. As the nonaqueous solvent, a normal temperature molten salt containing lithium ion is also usable.

When propylene carbonate is used as a cyclic carbonate and diethyl carbonate as a linear carbonate, since the effects to suppress gas generation in the nonaqueous electrolytic cell and suppress swelling in the nonaqueous electrolytic cell are significant, a solvent mixture containing propylene carbonate and diethyl carbonate is more preferably used.

In the present invention, in order to suppress the swelling in the nonaqueous electrolytic cell by gas generation, at least prior to the initial charge-discharge step in the manufacturing step of the nonaqueous electrolytic cell, vinylene carbonate is contained in the nonaqueous electrolyte and further, 1,3-propanesultone may be contained. Since the vinylene carbonate and 1,3-propanesultone are at least partially removed through the initial charge-discharge step, they are sometimes not detected in the nonaqueous electrolyte which the nonaqueous electrolytic cell completed through the initial charge-discharge step has; however, a nonaqueous electrolytic cell produced by the manufacturing method of the present invention includes the above-mentioned case. When vinylene carbonate is contained in the nonaqueous electrolyte used at the time of assembly, in terms of the effect of suppressing the swelling in the nonaqueous electrolytic cell, the content thereof is preferably 10% by weight or less in the nonaqueous electrolyte and more preferably 0.5 to 5% by weight. Further, When 1,3-propanesultone is contained, the content thereof is preferably 0.5 to 5% by weight in the nonaqueous electrolyte. Combination use of 1,3-propanesultone makes it possible to lower the optimum content of vinylene carbonate or the optimum contents of vinylene carbonate and 1,3-propanesultone.

As described above, with respect to the nonaqueous electrolytic cell of the present invention, vinylene carbonate is contained, as described above, in the nonaqueous electrolyte of the nonaqueous electrolytic cell having a negative electrode containing the negative active material such as lithium titanate and accordingly the coat is formed on the negative electrode surface and at the same time, the nonaqueous electrolytic cell is used in a negative electrode potential region nobler than lithium potential by 0.8V and accordingly the gas generation at the time of high temperature storage is suppressed by the coat.

When the nonaqueous electrolytic cell is used in a region where the negative electrode potential is 0.8 V or less, i.e. within 0.8 V, relative to the lithium potential, just like Comparative Example (the negative electrode potential at the end-of-charging is 0.2 V relative to the lithium potential in the standstill-at-high temperature test) described below, the gas generation at the time of high temperature storage cannot be suppressed as compared with the case the nonaqueous electrolytic cell is used in a region of a negative electrode potential nobler than the lithium potential by 0.8 V.

As described in the following Examples, when the cell internal gas after the nonaqueous electrolytic cell is left at 60° C. for 2 weeks is analyzed, gas generation of hydrogen, carbon dioxide, methane, ethylene and ethane is confirmed. It can be said that these gas generation affects the swelling in the cell; however if vinylene carbonate is contained in the nonaqueous electrolyte of the nonaqueous electrolytic cell and a coat is formed on the negative electrode surface, it is confirmed that the hydrocarbon gas (methane, ethylene, and ethane) and carbon dioxide do not at all exist or scarcely exist (hydrocarbon gas and carbon dioxide are substantially not detected) and accordingly, it can be found that the gas generation at the time of high temperature storage is suppressed and the cell swelling is remarkably decreased. Accordingly, in the present invention, it is preferable for the cell internal gas after the cell is left at 60° C. for 2 weeks to satisfy that a ratio of the total volume of methane, ethylene, and ethane to the total volume of hydrogen, carbon dioxide, methane, ethylene, and ethane is less than 0.3% and that a ratio of the carbon dioxide volume to the cell capacity is less than 0.4 µl/mAh.

The above-mentioned fact suggests that with respect to the nonaqueous electrolytic cell of the present invention, a coat which does not generate hydrocarbon gas and carbon dioxide and which has completely different characteristics from conventional coats generating hydrocarbon gas and carbon dioxide is formed by containing vinylene carbonate in the nonaqueous electrolyte of the nonaqueous electrolytic cell.

In order to suppress the gas generation, it is important to make the coat with a certain thickness exist on the negative electrode surface. The coat has a carbonate structure.

Such a coat can be formed by electrochemical treatment as shown in the following Examples; however it may be formed by chemical and physical treatment. The present invention can be applied regardless of the type of the positive active material.

In order to suppress hydrogen gas generation and suppress swelling in the nonaqueous electrolytic cell, the thickness of the coat is preferably 10 nm or more and more preferably 10 to 20 nm.

Formation of the coat on the negative electrode surface by electrochemical treatment is made possible to carry out initial charge-discharge before use of the nonaqueous electrolytic cell, and with respect to the present invention, when the nonaqueous electrolyte containing vinylene carbonate is used, as shown in Example 1, the coat is formed on the negative electrode surface even if the initial charge-discharge is carried out in a condition that the negative electrode potential after charging is nobler than lithium potential by 0.8 V (e.g. about 1.5 V) to suppress the gas generation.

As shown in Example 2, when a method of lowering the negative electrode potential to 0.4 V or less, i.e. within 0.4 V, (e.g. about 0.2 V) relative to the lithium potential at least once in the initial charge-discharge step is employed, the coat with which the gas generation is more efficiently suppressed can be formed on the negative electrode surface.

The nonaqueous electrolytic cell of the present invention is used in a region of a negative electrode potential nobler than the lithium potential by 0.8 V and the negative electrode potential can be lowered to 0.4 V or less to lithium potential by making the charge voltage at the time of the initial charge-discharge higher than that in use.

Since it becomes easy to form a coat having the carbonate structure on the negative electrode surface by reduction decomposition of the nonaqueous solvent having the carbonate structure by setting the negative electrode potential to 0.4 V or less to the lithium potential, it is preferable to 0.4 V or less.

Further, as shown in the following Examples, it is preferable to design a cell in such a manner that even in a region where the negative electrode potential is 0.4 V or less, i.e. within 0.4 V, (e.g. about 0.2 V) relative to the lithium potential, the positive electrode potential is 4.5 V or less, within 4.5 V (e.g. about 4.3 V) relative to the lithium potential in its entire region.

In the case the positive electrode potential exceeds 4.5 V to the lithium potential when the negative electrode is 0.4 V or less to lithium potential, a large quantity of carbon dioxide may possibly be generated from the positive electrode and therefore, it is not preferable.

In the case the negative electrode is lowered to 0.4 V or less to the lithium potential, it is preferable to use copper, nickel, or its alloy which are not alloyed with lithium for a negative electrode current collector.

Example 1

Hereinafter, the present invention will be described with reference to Examples and Comparative Examples; however it is not intended to limit the present invention thereto.

(Preparation of Nonaqueous Electrolyte)

The following 7 kinds of nonaqueous electrolytes were employed.

[1] 1 M $LiPF_6$ PC:DEC=7:3 (% by volume) (Comparative Example)

[2] 1 M $LiPF_6$ PC:DEC=7:3 (% by volume)+1% by mass of VC (Example)

[3] 1 M $LiPF_6$ PC:DEC=7:3 (% by volume)+5% by mass of VC (Example)

[4] 1 M $LiPF_6$ PC:DEC=7:3 (% by volume)+5% by mass of VC+5% by mass PS (Example)

[5] 1 M $LiPF_6$ PC:DEC=7:3 (% by volume)+5% by mass of PS (Comparative Example)
[6] 1 M $LiPF_6$ PC:DEC=7:3 (% by volume)+5% by mass of DES (Comparative Example)
[7] 1 M $LiPF_6$ PC:DiEE=5:5 (% by volume) (Comparative Example)

The abbreviations used mean as follows.
PC: Propylene carbonate
DEC: Diethyl carbonate
VC: Vinylene carbonate
PS: 1,3-Propane sultone
DES: Diethyl sulfite
DiEE: Diethylene glycol dimethyl ether (Preparation of Nonaqueous Electrolytic Cell)

After a positive electrode slurry containing 90 parts by weight of lithium-transition metal composite oxide ($LiNi_{1/3}Co_{1/3}Mn_{1/3}O_2$) powders being a positive active material, 5 parts by weight of acetylene black being a conductive material, and 5 parts by weight of poly(vinylidene fluoride) being a binder and using N-methylpyrrolidone (NMP) as a solvent was applied to both faces of a positive electrode current collector (made of aluminum, thickness of 20 μm) in such a manner that the density of the electrode composite layer became 26 mg/cm$^2$ (excluding the current collector), the current collector was dried and pressed to prepare a positive electrode.

After a negative electrode slurry containing 85 parts by weight of spinel type lithium titanate ($Li_4Ti_5O_{12}$) powders (manufactured by Ishihara Sangyo Kaisha, Ltd., product No.: LT855 (Lot. 0036), BET specific surface area: 3.0 m$^2$/g, bulk density: 1.0 g/cm$^2$, median diameter measured by laser diffraction scattering method: 21.2 μm) being a negative active material, 7 parts by weight of acetylene black being a conductive material, and 8 parts by weight of poly(vinylidene fluoride) (PVdF) being a binder and using N-methylpyrrolidone (NMP) as a solvent was applied to both faces of a negative electrode current collector (made of copper, thickness of 10 μm) in such a manner that the density of the electrode composite layer became 21 mg/cm$^2$ (excluding the current collector), the current collector was dried and pressed to prepare a positive electrode.

A rolled electrode unit obtained by flattening and rolling the positive electrode and negative electrode while sandwiching a porous separator made of polyethylene was housed in a square container made of aluminum (height: 49.3 mm, width: 33.7 mm, thickness: 5.17 mm) and 3.5 g of each of the nonaqueous electrolytes [1] to [7] was filled thereinto and thereafter, the container was sealed and left over night at a temperature of 25° C. Next, "initial charge-discharge" was carried out. The conditions of the initial charge-discharge were as follows: temperature: 25° C., charge current: 100 mA, charge voltage: 2.5 V, charge time: 20 hours, discharge current: 100 mA, and end-of-charge voltage: 1.0 V. The positive electrode potential at the 2.5 V of end-of-charge of the cell was about 4.0 V to lithium potential and the negative electrode potential was about 1.5 V to lithium potential. While a thirty minute interval was kept respectively after charging and after discharging, the charge-discharge was repeated 3 cycles. In such a manner, each nonaqueous electrolytic cell with a designed capacity of 500 mAh was prepared. Each cell prepared in such a manner had 0.25 ml of a dead space in the container. The dead space was filled with air in the same volume as that at the time after sealing and before the initial charge-discharge step and vapor derived from the liquid electrolyte components.

In such a manner, experimental nonaqueous electrolytic cells No. 1-1 to No. 1-7 using the nonaqueous electrolytes [1] to [7] were prepared.

After the preparation, one cycle of charge-discharge was carried out in the same conditions as those of the initial charge-discharge of the cells, the discharge capacity (initial cell capacity) was measured. Further, before and after the initial charge-discharge step, the thickness of the center part of each cell was measured to evaluate the change of cell thickness during the initial charge-discharge step.

(Standstill-at-High Temperature Test)

A standstill-at-high temperature test was carried out to each cell prepared in such a manner. That is, after constant current and constant voltage charge was carried out at 100 mA of charge current and 2.5 V of charge voltage (negative electrode potential at end-of-charge was about 1.5 V to lithium potential) for 20 hours of charge duration, each cell was left at 60° C. for 2 weeks. After being left as described, each cell was left at 25° C. for 1 day and again the center thickness of the cell was measured to determine the difference between the thickness and that measured before the initial charge-discharge step. Next, constant current discharge was carried out at 100 mA of discharge current and 1.0 V of end-of-discharge voltage, and the remaining capacity was measured.

(Measurement of Coat Thickness)

The negative electrode surface of each cell prepared in the manner was observed by an X-ray photoelectron spectroscopic apparatus (XPS). The XPS measurement is to be carried out by irradiating X-ray to a sample and observing the data of the reflection of the X-ray, and since the minimum incident depth of X-ray is 10 nm, at the time of starting measurement, the averaged information relevant to the surface layer part in 10 nm is obtained as data. Accordingly, when there was a peak particular for the active material at the time of starting the measurement, it was defined to be 10 nm or less. When there was no peak particular for the active material at the time of starting the measurement and only the information of the coat having the carbonate structure was appeared, the thickness of the coat was defined to be 10 nm or more and next, the measurement was continued while each sample was dug at a speed of 2 nm per 1 minute by Ar sputtering and at the moment when the information particular for the active material was mixed, the thickness of the coat was determined.

(Measurement of Gas Amount and Analysis of Gas Component)

The measurement of gas amount in each cell was carried out according to the following procedure. A water bath filled with liquid paraffin was prepared and a graduated measuring cylinder was submerged in the water bath. Each cell was submerged in the water bath, the container of the cell was opened in the water bath, and the gas in the cell was trapped entirely in form of bubbles in the measuring cylinder. The trapped gas volume was determined by reading the scale of the measuring cylinder, and defined as the internal cell gas amount.

The samples gas was subjected to quantitative analysis by gas chromatography (GC) analysis apparatus (Model No.: GC-14BPTF, manufactured by Shimadzu Corporation). Upon analysis, calibration curves were obtained by using standard gases for hydrogen, nitrogen, oxygen, carbon dioxide, methane, ethylene, and ethane. The number of the repeated measurement for a single measurement object component was 2 or higher to confirm the reproducibility. With respect to measurement conditions, for hydrogen, nitrogen, and oxygen, DB5MS was employed as a column: column temperature was set to 40° C.: and TCD was employed as a detector. For carbon dioxide, methane, ethylene, and ethane, Carbo-bond was employed as a column: column temperature was set to 50° C.: and TCD and CDD were employed as a detector for carbon dioxide and for methane, ethylene and ethane, respectively. The gas injection amount was set to 50 µl.

From the quantitative measurement results, the ratio of the total volume of methane, ethylene, and ethane to the total volume of hydrogen, carbon dioxide, methane, ethylene, and ethane was calculated.

The volume of carbon dioxide in the cell internal gas was determined by calculation, at first obtaining the ratio of the volume of carbon dioxide to the volume excluding nitrogen and oxygen based on the data resulted from the GC measurement and multiplying the ratio by a value calculated by subtracting the volume of the dead space (0.25 ml in this Example) of the container from the volume resulted from the measurement result of the gas amount in the cell.

That is, at the time of the calculation, it was assumed that the amount of carbon dioxide originally existing in air was neglected and nitrogen and oxygen were only derived from those originally existing in air. According to such a calculation method, since the measurement values of nitrogen and oxygen were excluded in the calculation base, even if the possibility of contamination of the measurement sample with air in an analysis chamber during the gas analysis could not be denied, the effect could be eliminated.

The measurement results of the change of cell thickness, cell capacity, coat thickness on the negative electrode surface, and cell internal gas amount (gas components) are shown in Table 1.

carbon ratio")" in the components in the cell internal gas, and carbon dioxide generation amount.

With respect to the cell (Experiment No. 1-1) of Comparative Example using the nonaqueous electrolyte [1] containing no additive, the coat thickness was less than 10 nm, the hydrocarbon ratio was as high as 3.8%, and the carbon dioxide generation amount was 0.4 µl/mAh or more, and therefore the cell thickness increase was significant after standstill at 60° C.

On the other hand, with respect to the cells (Experiments No. 1-3 and No. 1-4) as Examples of the present invention using the nonaqueous electrolyte [3] containing VC as an additive and the nonaqueous electrolyte [4] containing PS in addition to VC, the coat thickness was 10 to 20 nm, methane, ethylene, and ethane, being hydrocarbons, were substantially not detected (hydrocarbon ratio was 0), the carbon dioxide generation amount was less than 0.4 µl/mAh, and therefore the cell thickness increase was slight after standstill at 60° C.

In terms of VC content, the cell using the nonaqueous electrolyte [2] containing 1% by weight of VC showed less increase of the cell thickness after standstill at 60° C. than the cell using the nonaqueous electrolyte [3] containing 5% by weight of VC.

However, with respect to the cell (Experiment No. 1-5) of Comparative Example using the nonaqueous electrolyte [5] containing PS alone as an additive, coat thickness was less than 10 nm, the hydrocarbon ratio was 0.4%, that is, 0.3% or more, and therefore the increase of the cell thickness after standstill at 60° C. was not significant as compared with the cell (Experiment No. 1-1) using the nonaqueous electrolyte [1] containing no additive.

With respect to the cell (Experiment No. 1-6) of Comparative Example using the nonaqueous electrolyte [6] containing

TABLE 1

| Experiment No. | Nonaqueous electrolyte | Cell thickness change (mm) | | Cell capacity | Coating | Cell | Hydro- | $CO_2$ |
| | | Initial charging and discharging | After standstill at 60° C. | Remaining capacity ratio (%) | thickness on negative electrode surface | inner gas amount (cc) | carbon ratio (%) | generation amount (µl/mAh) |
|---|---|---|---|---|---|---|---|---|
| 1-1 | PC:DEC = 7:3 | 0.0 | 2.3 | 83 | 10> | 2.5 | 3.8 | 0.4 |
| 1-2 | PC:DEC = 7:3 + 1% VC | 0.0 | 0.5 | 92 | 10 to 20 | 0.4 | Not measured | Not measured |
| 1-3 | PC:DEC = 7:3 + 5% VC | 0.0 | 0.8 | 91 | 10 to 20 | 0.6 | 0.0 | 0.2 |
| 1-4 | PC:DEC = 7:3 + 5% VC + 5% PS | 0.0 | 0.4 | 103 | 10 to 20 | 0.3 | 0.0 | 0.0 |
| 1-5 | PC:DEC = 7:3 + 5% PS | 0.1 | 1.5 | 86 | 10> | 1.0 | 0.4 | 0.1 |
| 1-6 | PC:DEC = 7:3 + 5% DES | 1.7 | 4.3 | 42 | 10 to 20 | 6.5 | 56.2 | 2.3 |
| 1-7 | PC:DiEE = 5:5 | 0.4 | 3.3 | 65 | 10 to 20 | 7.5 | 12.9 | 0.0 |

From Table 1, when the condition of the initial charge-discharge step was set to that the negative electrode potential at the end-of-charge was about 1.5 V to the lithium potential, that is, when no overcharge was carried out, it could be said as follows.

At first, it was found that the increase of the cell thickness after standstill at 60° C. for 2 weeks (hereinafter referred to as "after standstill at 60° C.") was related to the coat thickness on the negative electrode surface, addition of VC to the nonaqueous electrolyte, "the ratio of the total volume of methylene, ethylene, and ethane to the total volume of hydrogen, carbon dioxide, methane, ethylene, and ethane (hereinafter "hydro- DES as an additive, coat thickness was 10 to 20 nm, but the hydrocarbon ratio was as high as 56.2%, and also had high carbon dioxide generation amount and therefore the increase of the cell thickness after standstill at 60° C. was most significant.

With respect to the cell (Experiment No. 1-7) of Comparative Example using the nonaqueous electrolyte [7] containing a solvent mixture of PC and DiEE, coat thickness was 10 to 20 nm, but the hydrocarbon ratio was as high as 12.9%, and therefore the increase of the cell thickness after standstill at 60° C. was higher than that of the cell (Experiment No. 1-1) using the nonaqueous electrolyte [1] using the mixed solvent of PC and DEC and no additive.

The cells of the present invention using the nonaqueous electrolytes [2], [3], and [4] containing VC as an additive and showing slight increase of the cell thickness after standstill at high temperature showed higher remaining capacities after standstill at 60° C. than those of cells of Comparative Examples using the nonaqueous electrolytes [1], [5] to [7] and showing significant increase of the cell thickness after standstill at 60° C.

Example 2

Nonaqueous electrolytic cells of Experiments No. 2-1 to No. 2-7 using nonaqueous electrolytes [1] to [7] were prepared in the same manner, except that the charge voltage was changed to 4.1 V in the above-mentioned initial charge-discharge step. The positive electrode potential at the end-of-charge of 4.1 V the cells was about 4.3 V to the lithium potential and the negative electrode potential was about 0.2 V to the lithium potential. After the preparation, one cycle charge-discharge was carried out in the same condition as the initial charge-discharge of the cells except that the charge voltage was changed to 2.5 V and thereafter the discharge capacity (initial cell capacity) was measured.

The standstill-at-high temperature test, measurement of coat thickness, measurement of gas amount and analysis of gas components were carried out in the same manner as Example 1.

Measurement results of the change of cell thickness, cell capacity, coat thickness on the negative electrode surface, and cell internal gas amount (gas components) are shown in Table 2.

On the other hand, with respect to the cells (Experiments No. 2-3 and No. 2-4) as Examples of the present invention using the nonaqueous electrolyte [3] containing VC as an additive and the nonaqueous electrolyte [4] containing PS in addition to VC, when overcharge was carried out, methane, ethylene, and ethane, being hydrocarbons, were substantially not detected (hydrocarbon ratio was 0), and the carbon dioxide was substantially also not detected, and therefore the cell thickness increase became slighter after standstill at 60° C. than that in the case no overcharge was carried out.

The cell using the nonaqueous electrolyte [2] containing 1% by weight of VC also showed less increase of the cell thickness after standstill at 60° C. in the case overcharge was carried out than that in the case no overcharge was carried out; however the cell using the nonaqueous electrolyte [3] containing 5% by weight of VC showed more significantly less.

However, the cell (Experiment No. 2-5) of Comparative Example using the nonaqueous electrolyte [5] containing PS alone as an additive contrarily showed higher hydrocarbon ratio increase (0.4%→3.3%) in the case overcharge was carried out than that in the case no overcharge was carried out, and therefore the increase of the cell thickness after standstill at 60° C. was more significant.

The cell (Experiment No. 2-6) of Comparative Example using the nonaqueous electrolyte [6] containing DES as an additive showed higher hydrocarbon ratio (56.2%→78.5%) in the case overcharge was carried out than that in the case no overcharge was carried out, and therefore the increase of the cell thickness after standstill at 60° C. was more significant.

TABLE 2

| Experiment No. | Nonaqueous electrolyte | Cell thickness change (mm) | | Cell capacity | Coating thickness on negative electrode surface | Cell inner gas amount (cc) | Hydrocarbon ratio (%) | $CO_2$ generation amount (µl/mAh) |
|---|---|---|---|---|---|---|---|---|
| | | Initial charging and discharging | After standstill at 60° C. | Remaining capacity ratio (%) | | | | |
| 2-1 | PC:DEC = 7:3 | 0.3 | 3.0 | 69 | 10 to 20 | 5.5 | 5.0 | 1.1 |
| 2-2 | PC:DEC = 7:3 + 1% VC | 0.1 | 0.4 | 90 | 10 to 20 | 0.4 | Not measured | Not measured |
| 2-3 | PC:DEC = 7:3 + 5% VC | 0.1 | 0.3 | 94 | 10 to 20 | 0.3 | 0.0 | 0.0 |
| 2-4 | PC:DEC = 7:3 + 5% VC + 5% PS | 0.0 | 0.1 | 99 | 10 to 20 | 0.2 | 0.0 | 0.0 |
| 2-5 | PC:DEC = 7:3 + 5% PS | 0.3 | 2.4 | 74 | 10 to 20 | 2.5 | 3.3 | 0.3 |
| 2-6 | PC:DEC = 7:3 + 5% DES | 2.0 | 5.7 | 0 | 10 to 20 | 12.5 | 78.5 | 1.1 |
| 2-7 | PC:DiEE = 5:5 | 0.6 | 2.6 | 63 | 10 to 20 | 4.5 | 18.6 | 0.1 |

From Table 2, when the condition of the initial charge-discharge step was set to that the negative electrode potential at the end-of-charge was about 0.2 V to the lithium potential, that is, when overcharge was carried out, the increase of the cell thickness after standstill at 60° C. was related to addition of VC to the nonaqueous electrolyte, hydrocarbon ratio in the components in the cell internal gas, and carbon dioxide generation amount.

With respect to the cell (Experiment No. 2-1) of Comparative Example using the nonaqueous electrolyte [1] containing no additive, although a coat with a thickness of 10 to 20 nm was formed, the hydrocarbon ratio was increased more (3.8%→5.0%) than that in the case no overcharge was carried out and the carbon dioxide generation amount was increased more (0.4 µl/mAh→1.1 µl/mAh) and therefore, the cell thickness increase became significant after standstill at 60° C.

The cell (Experiment No. 2-7) of Comparative Example using the nonaqueous electrolyte [7] containing a solvent mixture of PC and DiEE showed a hydrocarbon ratio as high as 18.6% in the case overcharge was carried out, and therefore the increase of the cell thickness after standstill at 60° C. was significant (slightly smaller than that in the case no overcharge was carried out).

Example 3

High Rate Discharge Test

Cells prepared in the Example 2 (cells of Experiment No. 3-1, No. 3-2, No. 3-3, and No. 3-4 were same as cells of Experiment No. 2-1, No. 2-3, No. 2-4, and No. 2-5, respectively) were subjected to a high rate discharge test. After cell preparation and in the standstill-at-high temperature test, after constant current and constant voltage charge at charge current of 100 mA for 20 hour of charge time was carried out, the cells were discharged to 1.0 V finishing voltage at discharge current of 500 mA (corresponding to 1 It) or 3500 mA (corresponding to 7 It), and the discharge capacities were recorded.

The results of the high rate discharge test are shown in Table 3.

TABLE 3

| Experiment No. | Nonaqueous electrolyte | Capacity before standstill at 60° C. (mAh) | | Capacity after standstill at 60° C. (mAh) | |
|---|---|---|---|---|---|
| | | Discharge at 1 ItA | Discharge at 7 ItA | Discharge at 1 ItA | Discharge at 7 ItA |
| 3-1 | PC:DEC = 7:3 | 96 | 73 | 78 | 26 |
| 3-2 | PC:DEC = 7:3 + 5% VC | 99 | 93 | 96 | 88 |
| 3-3 | PC:DEC = 7:3 + 5% VC + 5% PS | 97 | 53 | 97 | 58 |
| 3-4 | PC:DEC = 7:3 + 5% PS | 96 | 92 | 79 | 40 |

From Table 3, it can be found that the cell (Experiment No. 3-2) as Example of the present invention using the nonaqueous electrolyte [3] containing VC as an additive and the cell (Experiment No. 3-3) as Example of the present invention using the nonaqueous electrolyte [4] containing PS in addition to VC showed less decrease of the remaining capacity after standstill at 60° C. than the cell (Experiment No. 3-1) as Comparative Example using the nonaqueous electrolyte [1] containing no additive and the cell (Experiment No. 3-4) as Comparative Example using the nonaqueous electrolyte [5] containing PS alone as an additive, even if high rate discharge was carried out.

Example 4

Comparative Example

The cell (Experiment No. 2-4) using the nonaqueous electrolyte [4] containing PS in addition to VC as an additive was subjected to the standstill-at-high temperature test in the same manner as Example 2, except that the charge voltage was changed to 4.1 V (the negative electrode potential at the end-of-charge was about 0.2 V to the lithium potential), and change of the cell thickness, cell capacity, and gas amount (gas components) were measured.

Measurement results are shown in Table 4 in combination with the result of the experiment No. 2-4 of Example 2

TABLE 4

| Experiment No. | Nonaqueous electrolyte | Cell thickness change (mm) | | Cell capacity |
|---|---|---|---|---|
| | | Initial charging and discharging | After standstill at 60° C. | Remaining capacity ratio (%) |
| 2-4 | PC:DEC = 7:3 + 5% VC + 5% PS(2.5 V) | 0.0 | 0.1 | 99 |

TABLE 4-continued

| Experiment No. | Nonaqueous electrolyte | Cell thickness change (mm) | | Cell capacity |
|---|---|---|---|---|
| | | Initial charging and discharging | After standstill at 60° C. | Remaining capacity ratio (%) |
| 4-1 | PC:DEC = 7:3 + 5% VC + 5% PS(4.1 V) | 0.0 | 0.8 | 78 |

As shown in Table 4, in the standstill-at-high temperature test for the cell using the nonaqueous electrolyte [4] containing PS in addition to VC as an additive, when the charge voltage was set to 2.5 V (the negative electrode potential was about 1.5 V to the lithium potential) (Experiment No. 2-4), the cell thickness change was 0.1 mm and on the other hand, in the standstill-at-high temperature test, when the charge voltage was set to 4.1 V (the negative electrode potential was about 0.2 V to the lithium potential) (Experiment No. 4-1), the cell thickness change was 0.8 mm, higher than that in the former, and therefore, it can be found that the nonaqueous electrolytic cell of the present invention is important to be used in a region where the negative electrode potential is nobler than lithium potential by 0.8 V.

Example 5

Nonaqueous electrolytic cells of Experiments No. 5-1 and No. 5-2 (using the following two types of nonaqueous electrolytes [1] and [2], respectively) were prepared in the same manner as Example 1, except that the nonaqueous electrolytes [1] and [2] were used, and the cells were subjected to the test.

[1] 1 M $LiPF_6$ PC:DEC=5:5 (% by volume) (Comparative Example)

[2] 1 M $LiPF_6$ PC:DEC=5:5 (% by volume)+5% by mass of VC (Example)

Measurement results of the change of cell thickness, cell capacity, coat thickness on the negative electrode surface, and cell internal gas amount (gas components) are shown in Table 5.

TABLE 5

| Experiment No. | Nonaqueous electrolyte | Cell thickness change (mm) | | Cell capacity | Coating thickness on negative electrode surface | Cell inner gas amount (cc) | Hydro-carbon ratio (%) | $CO_2$ generation amount (μl/mAh) |
|---|---|---|---|---|---|---|---|---|
| | | Initial charging and discharging | After standstill at 60° C. | Remaining capacity ratio (%) | | | | |
| 5-1 | PC:DEC = 5:5 | 0.0 | 2.7 | 77 | 10> | 3.1 | 0.0 | 0.7 |
| 5-2 | PC:DEC = 5:5 + 5% VC | 0.0 | 0.8 | 91 | 10 to 20 | 0.5 | 0.0 | 0.2 |

From Table 5, when the nonaqueous electrolyte of PC:DEC=5:5 (% by volume) was used and no overcharge was carried out, the increase of the cell thickness after standstill at 60° C. was found being related to the coat thickness on the negative electrode surface, addition of VC to the nonaqueous electrolyte, hydrocarbon ratio in the cell internal gas, and carbon dioxide generation amount and particularly to the carbon dioxide generation amount.

With respect to the cell (Experiment No. 5-1) of Comparative Example using the nonaqueous electrolyte [1] containing no additive, although methane, ethylene, and ethane, being hydrocarbons, were substantially not detected (hydrocarbon ratio was 0), the coat thickness was less than 10 nm and the carbon dioxide generation amount was as high as 0.7 μl/mAh, and therefore the cell thickness increase was significant after standstill at 60° C.

On the other hand, with respect to the cell (Experiment No. 5-2) of Example using the nonaqueous electrolyte [2] containing VC as an additive, the coat thickness was 10 to 20 nm, methane, ethylene, and ethane, being hydrocarbons, were substantially not detected (hydrocarbon ratio was 0), and the carbon dioxide generation amount was less than 0.4 μl/mAh, and therefore the cell thickness increase was slight after standstill at 60° C.

Example 6

Nonaqueous electrolytic cells of Experiments No. 6-1 to No. 6-5 (using the following five types of nonaqueous electrolytes [1] to [5], respectively) were prepared in the same manner as Example 2, except that the nonaqueous electrolytes [1] to [5] were used, and the cells were subjected to the test.

[1] 1 M $LiPF_6$ PC:DEC=5:5 (% by volume) (Comparative Example)
[2] 1 M $LiPF_6$ PC:DEC=5:5 (% by volume)+5% by mass of VC (Example)
[3] 1 M $LiPF_6$ PC:DEC=5:5 (% by volume)+5% by mass of VC+5% by mass of PS (Example)
[4] 1 M $LiPF_6$ PC:DEC=5:5 (% by volume)+10% by mass of VC (Example)
[5] 1 M $LiPF_6$ PC:DEC=5:5 (% by volume)+20% by mass of VC (Example)

Measurement results of the change of cell thickness, cell capacity, coat thickness on the negative electrode surface, and cell internal gas amount (gas components) are shown in Table 6.

TABLE 6

| Experiment No. | Nonaqueous electrolyte | Cell thickness change (mm) | | Cell capacity | Coating thickness on negative electrode surface | Cell inner gas amount (cc) | Hydro-carbon ratio (%) | $CO_2$ generation amount (μl/mAh) |
|---|---|---|---|---|---|---|---|---|
| | | Initial charging and discharging | After standstill at 60° C. | Remaining capacity ratio (%) | | | | |
| 6-1 | PC:DEC = 5:5 | 0.2 | 3.9 | 68 | 10 to 20 | 9.6 | 0.0 | 2.0 |
| 6-2 | PC:DEC = 5:5 + 5% VC | 0.0 | 0.1 | 97 | 10 to 20 | 0.3 | 0.0 | 0.0 |
| 6-3 | PC:DEC = 5:5 + 5% VC + 5% PS | 0.0 | 0.0 | 98 | 10 to 20 | 0.3 | 0.0 | 0.0 |
| 6-4 | PC:DEC = 5:5 + 10% VC | 0.2 | 0.8 | 93 | 10 to 20 | 0.5 | 0.0 | 0.2 |
| 6-5 | PC:DEC = 5:5 + 20% VC | 0.4 | 1.9 | 86 | 10 to 20 | 1.5 | 0.0 | 1.2 |

From Table 6, when the nonaqueous electrolyte of PC:DEC=5:5 (% by volume) was used and overcharge was carried out, the increase of the cell thickness after standstill at 60° C. was found being related to the addition of VC to the nonaqueous electrolyte, hydrocarbon ratio in the cell internal gas, and carbon dioxide generation amount and particularly to the carbon dioxide generation amount.

With respect to the cell (Experiment No. 6-1) of Comparative Example using the nonaqueous electrolyte [1] containing no additive, when overcharge was carried out, although a coat with thickness of 10 to 20 nm was formed, the carbon dioxide generation amount was more increased (0.7 μl/mAh→2.0 μl/mAh) than that when no overcharge was carried out and accordingly, the cell thickness increase became significant after standstill at 60° C.

On the other hand, with respect to the cells (Experiments No. 6-2 and 6-3) of Example using the nonaqueous electrolyte [2] containing 5% by mass of VC as an additive and the nonaqueous electrolyte [3] further containing PS in addition to VC, respectively, the coat with thickness of 10 to 20 nm was formed when overcharge was carried out, and methane, ethylene, and ethane, being hydrocarbons, were substantially not detected (hydrocarbon ratio was 0), and the carbon dioxide was also substantially not detected and therefore the cell thickness increase became further slighter than that when no overcharge was carried out, after standstill at 60° C.

Further, it is also found that when overcharge was carried out, as the content of VC in the nonaqueous electrolyte was increased more to 10% by weight of VC (nonaqueous electrolyte [4]) and to 20% by weight of VC (nonaqueous electrolyte [5]), the carbon dioxide generation amount was increased more and the increase of the cell thickness became more significant after standstill at 60° C. (Experiment Nos. 6-4 and 6-5) and therefore, the content of VC was found to be preferably 10% by weight or less.

Example 7

Nonaqueous electrolytic cells of Experiments No. 7-1 to No. 7-7 (using the following seven types of nonaqueous electrolytes {1} to {7}, respectively) were prepared in the same manner as Example 1, except that the nonaqueous electrolytes {1} to {7} were used, and the cells were subjected to the test.
{1} 1 M LiPF$_6$ PC:DEC=3:7 (% by volume) (Comparative Example)
{2} 1 M LiPF$_6$ PC:DEC=3:7 (% by volume)+0.5% by mass of VC (Example)
{3} 1 M LiPF$_6$ PC:DEC=3:7 (% by volume)+1% by mass of VC (Example)
{4} 1 M LiPF$_6$ PC:DEC=3:7 (% by volume)+3% by mass of VC (Example)
{5} 1 M LiPF$_6$ PC:DEC=3:7 (% by volume)+5% by mass of VC (Example)
{6} 1 M LiPF$_6$ PC:MEC=3:7 (% by volume)+1% by mass of VC (Example)
{7} 1 M LiPF$_6$ PC:DMC=3:7 (% by volume)+1% by mass of VC (Example)

Measurement results of the change of cell thickness, cell capacity, coat thickness on the negative electrode surface, and cell internal gas amount are shown in Table 7.

From Table 7, when the nonaqueous electrolytes of PC:DEC=3:7 (% by volume), PC:MEC=3:7 (% by volume), and PC:DMC=3:7 (% by volume) were used and no overcharge was carried out, the increase of the cell thickness after standstill at 60° C. was found being related to the coat thickness on negative electrode surface and addition of VC to the nonaqueous electrolytes.

With respect to the cell (Experiment No. 7-1) of Comparative Example using the nonaqueous electrolyte {1} containing no additive, the coat thickness was less than 10 nm and the increase of the cell thickness after standstill at 60° C. was extremely significant, whereas with respect to the cells (Experiments No. 7-2 to No. 7-5) of Examples of the present invention using the nonaqueous electrolytes {2} to {5}, the coat thickness was 10 to 20 nm, the increase of the cell thickness after standstill at 60° C. was slight, and the increase of the cell thickness was less as the content of VC was less in the range of 0.5 to 5% by weight of VC.

In comparison with the cases various kinds of linear carbonates were added at the same PC ratio and VC content was same, the increase of the cell thickness was most suppressed in the case of the cell (Experiment No. 7-3) using the solvent mixture of propylene carbonate (PC) and diethyl carbonate (DEC), and it was increased more in the case of the cell (Experiment No. 7-6) using the solvent mixture of propylene carbonate (PC) and methyl ethyl carbonate (MEC) and the cell (Experiment No. 7-7) using the solvent mixture of propylene carbonate (PC) and dimethyl carbonate (DMC) in this order.

Example 8

Nonaqueous electrolytic cells of Experiments No. 8-1 (using {1}) and to No. 8-2 to No. 8-6 (using {3} to {7}, respectively) were prepared in the same manner as Example 2, except that the following six kind nonaqueous electrolytes {1} and {3} to {7} were used, and the cells were subjected to the test.
{1} 1 M LiPF$_6$ PC:DEC=3:7 (% by volume) (Comparative Example)
{3} 1 M LiPF$_6$ PC:DEC=3:7 (% by volume)+1% by mass of VC (Example)
{4} 1 M LiPF$_6$ PC:DEC=3:7 (% by volume)+3% by mass of VC (Example)
{5} 1 M LiPF$_6$ PC:DEC=3:7 (% by volume)+5% by mass of VC (Example)
{6} 1 M LiPF$_6$ PC:MEC=3:7 (% by volume)+1% by mass of VC (Example)

TABLE 7

| Experiment No. | Nonaqueous electrolyte | Cell thickness change (mm) | | Cell capacity | Coating | Cell |
| | | Initial charging and discharging | After standstill at 60° C. | Remaining capacity ratio (%) | thickness on negative electrode surface | inner gas amount (cc) |
| --- | --- | --- | --- | --- | --- | --- |
| 7-1 | PC:DEC = 3:7 | 0.2 | 2.4 | 85 | 10> | 2.5 |
| 7-2 | PC:DEC = 3:7 + 0.5% VC | 0.0 | 0.4 | 93 | 10 to 20 | 0.4 |
| 7-3 | PC:DEC = 3:7 + 1% VC | 0.0 | 0.4 | 93 | 10 to 20 | 0.6 |
| 7-4 | PC:DEC = 3:7 + 3% VC | 0.0 | 0.5 | 94 | 10 to 20 | 0.3 |
| 7-5 | PC:DEC = 3:7 + 5% VC | 0.0 | 0.8 | 94 | 10 to 20 | 1.0 |
| 7-6 | PC:MEC = 3:7 + 1% VC | 0.0 | 0.6 | 93 | 10 to 20 | 6.5 |
| 7-7 | PC:DMC = 3:7 + 1% VC | 0.0 | 0.8 | 94 | 10 to 20 | 7.5 |

{7} 1 M LiPF$_6$ PC:DMC=3:7 (% by volume)+1% by mass of VC (Example)

Measurement results of the change of cell thickness, cell capacity, coat thickness on the negative electrode surface, and cell internal gas amount are shown in Table 8.

TABLE 8

| Experiment No. | Nonaqueous electrolyte | Cell thickness change (mm) | | Cell capacity | Coating | Cell |
|---|---|---|---|---|---|---|
| | | Initial charging and discharging | After standstill at 60° C. | Remaining capacity ratio (%) | thickness on negative electrode surface | inner gas amount (cc) |
| 8-1 | PC:DEC = 3:7 | 0.4 | 3.6 | 68 | 10 to 20 | 7.3 |
| 8-2 | PC:DEC = 3:7 + 1% VC | 0.0 | 0.3 | 88 | 10 to 20 | 0.3 |
| 8-3 | PC:DEC = 3:7 + 3% VC | 0.0 | 0.1 | 97 | 10 to 20 | 0.3 |
| 8-4 | PC:DEC = 3:7 + 5% VC | 0.0 | 0.1 | 99 | 10 to 20 | 0.3 |
| 8-5 | PC:MEC = 3:7 + 1% VC | 0.3 | 0.9 | 73 | 10 to 20 | 0.6 |
| 8-6 | PC:DMC = 3:7 + 1% VC | 1.0 | 3.4 | 73 | 10 to 20 | 6.0 |

From Table 8, when the nonaqueous electrolytes of PC:DEC=3:7 (% by volume), PC:MEC=3:7 (% by volume), and PC:DMC=3:7 (% by volume) were used and overcharge was carried out, the increase of the cell thickness after standstill at 60° C. was found being related to the addition of VC to the nonaqueous electrolytes.

With respect to the cell (Experiment No. 8-1) of Comparative Example using the nonaqueous electrolyte {1} containing no additive, although the coat with thickness of 10 to 20 nm was formed when overcharge was carried out, the increase of the cell thickness after standstill at 60° C. was more than that when no overcharge was carried out.

On the other hand, with respect to the cells (Experiments No. 8-2 to No. 8-4) of Examples of the present invention using the nonaqueous electrolytes {3} to {5} containing VC as an additive, coat with the thickness of 10 to 20 nm was formed when overcharge was carried out and the increase of the cell thickness after standstill at 60° C. became slighter than that when no overcharge was carried out. Particularly, when the VC content was 3 or 5% by weight, the effect of suppressing the increase of the cell thickness was significant.

With respect to the cells (Experiments No. 8-5 and No. 8-6) of Examples of the present invention using the nonaqueous electrolytes {6} and {7} containing VC as an additive and nonaqueous electrolytes of PC/MEC and PC/DMC, the increase of the cell thickness after standstill at 60° C. became more significant when overcharge was carried out than that when no overcharge was carried out. Particularly, in the case of PC/DMC, such tendency was significant.

Example 9

Nonaqueous electrolytic cells of Experiments No. 9-1 to No. 9-3 (using the following three types of nonaqueous electrolytes <1> to <3>, respectively) were prepared in the same manner as Example 1, except that the nonaqueous electrolytes <1> to <3> were used, and the cells were subjected to the test.

<1> 1 M LiPF$_6$ PC:DEC=5:5 (% by volume) (Comparative Example)

<2> 1 M LiPF$_6$ PC:DEC=5:5 (% by volume)+5% by mass of VC (Example)

<3> 1 M LiPF$_6$ PC:DEC=5:5 (% by volume)+5% by mass of VC+5% by mass of PS (Example)

Measurement results of the change of cell thickness, cell capacity, coat thickness on the negative electrode surface, and cell internal gas amount are shown in Table 9.

TABLE 9

| Experiment No. | Nonaqueous electrolyte | Cell thickness change (mm) | | Cell capacity | Coating | Cell | Hydro- | $CO_2$ |
|---|---|---|---|---|---|---|---|---|
| | | Initial charging and discharging | After standstill at 60° C. | Remaining capacity ratio (%) | thickness on negative electrode surface | inner gas amount (cc) | carbon ratio (%) | generation amount (μl/mAh) |
| 9-1 | EC:DEC = 5:5 | 1.2 | 2.6 | 76 | 10> | 2.9 | 0.0 | 0.4 |
| 9-2 | EC:DEC = 5:5 + 5% VC | 0.1 | 1.7 | 88 | 10 to 20 | 1.2 | 0.0 | 1.1 |
| 9-3 | EC:DEC = 5:5 + 5% VC + 5% PS | 0.1 | 0.9 | 90 | 10 to 20 | 0.6 | 0.0 | 0.1 |

From Table 9, when the nonaqueous electrolyte of PC:DEC=5:5 (% by volume) was used and no overcharge was carried out, the increase of the cell thickness after standstill at 60° C. was found being related to the coat thickness on the negative electrode surface, the addition of VC to the nonaqueous electrolyte, hydrocarbon ratio in the cell internal gas components, and carbon dioxide generation amount and particularly to the carbon dioxide generation amount.

With respect to the cell (Experiment No. 9-1) of Comparative Example using the nonaqueous electrolyte <1> containing no additive, the coat thickness was less than 10 nm and the increase of cell thickness after standstill at 60° C. was significant, whereas with respect to the cell (Experiment No. 9-2) of Example of the present invention using the nonaqueous electrolyte <2> containing VC as an additive, the coat thickness was 10 to 20 nm and the increase of cell thickness after standstill at 60° C. was slightly suppressed; however the carbon dioxide generation amount was high and thus the suppression was not sufficient.

With respect to the cell (Experiment No. 9-3) of Example of the present invention using the nonaqueous electrolyte <3> containing PS in addition to VC as an additive, the coat thickness was 10 to 20 nm and methane, ethylene, and ethane, being hydrocarbon gases, were substantially not detected (hydrocarbon ratio was 0) and the carbon dioxide generation amount was less than 0.4 μl/mAh and therefore, the increase of cell thickness after standstill at 60° C. was small.

In terms of the effect of suppressing the increase of cell thickness, the cell using a solvent mixture of PC and DEC as a nonaqueous solvent was found showing more significant effect of suppressing the increase of cell thickness by adding VC than the cell using a solvent mixture of EC and DEC.

Example 10

Nonaqueous electrolytic cells of Experiments No. 10-1 to No. 10-3 (using the following three types of nonaqueous electrolytes <1> to <3>, respectively) were prepared in the same manner as Example 2, except that the nonaqueous electrolytes <1> to <3> were used, and the cells were subjected to the test.

<1> 1 M $LiPF_6$ PC:DEC=5:5 (% by volume) (Comparative Example)
<2> 1 M $LiPF_6$ PC:DEC=5:5 (% by volume)+5% by mass of VC (Example)
<3> 1 M $LiPF_6$ PC:DEC=5:5 (% by volume)+5% by mass of VC+5% by mass of PS (Example)

Measurement results of the change of cell thickness, cell capacity, coat thickness on the negative electrode surface, and cell internal gas amount (gas components) are shown in Table 10.

From Table 10, when the nonaqueous electrolyte of PC:DEC=5:5 (% by volume) was used and overcharge was carried out, the increase of the cell thickness after standstill at 60° C. was found being related to the addition of VC to the nonaqueous electrolyte, hydrocarbon ratio in the cell internal gas components, and carbon dioxide generation amount and particularly to the carbon dioxide generation amount.

With respect to the cell (Experiment No. 10-1) of Comparative Example using the nonaqueous electrolyte <1> containing no additive, although a coat with thickness of 10 to 20 nm was formed when overcharge was carried out, the carbon dioxide generation amount was increased more (0.4 μl/mAh→1.7 μl/mAh) than that when no overcharge was carried out and therefore the increase of cell thickness after standstill at 60° C. was increased.

On the other hand, with respect to the cells (Experiment No. 10-2 and No. 10-3) of Example of the present invention using the nonaqueous electrolyte <2> containing 5% by weight of VC as an additive and the nonaqueous electrolyte <3> containing PS in addition to VS, when overcharge was carried out, coats with thickness of 10 to 20 nm were formed and methane, ethylene, and ethane, being hydrocarbon gases, were substantially not detected (hydrocarbon ratio was 0) and carbon dioxide scarcely existed or substantially did not exist and therefore the increase of cell thickness after standstill at 60° C. became smaller than that when no overcharge was carried out.

As described above, with respect to a nonaqueous electrolytic cell having a negative electrode containing a negative active material such as lithium titanate, it was confirmed that the effect of the present invention to suppress gas generation at the time high temperature storage and suppress the cell swelling could be obtained by containing vinylene carbonate or vinylene carbonate and 1,3-propane sultone in the nonaqueous electrolyte, forming a coat on the negative electrode surface, and using the cell in a region where the negative electrode potential was nobler than the lithium potential by 0.8 V.

INDUSTRIAL APPLICABILITY

A nonaqueous electrolytic cell of the present invention can be used for many purposes including electric power storage facilities and motive energy for vehicle such as HEV and the like since the effect of swelling due to gas generation or the like can be moderated when being middle-sized, large-sized, and high capacity nonaqueous electrolytic cell.

The invention claimed is:
1. A method for manufacturing a nonaqueous electrolytic cell comprising a nonaqueous electrolyte containing an electrolyte salt and a nonaqueous solvent, a positive electrode,

TABLE 10

| Experiment No. | Nonaqueous electrolyte | Cell thickness change (mm) | | Cell capacity | Coating | Cell | Hydro- | $CO_2$ |
| | | Initial charging and discharging | After standstill at 60° C. | Remaining capacity ratio (%) | thickness on negative electrode surface | inner gas amount (cc) | carbon ratio (%) | generation amount (μl/mAh) |
| --- | --- | --- | --- | --- | --- | --- | --- | --- |
| 10-1 | EC:DEC = 5:5 | 0.2 | 3.6 | 68 | 10 to 20 | 7.3 | 0.0 | 1.7 |
| 10-2 | EC:DEC = 5:5 + 5% VC | 0.1 | 0.7 | 90 | 10 to 20 | 0.5 | 0.0 | 0.1 |
| 10-3 | EC:DEC = 5:5 + 5% VC + 5% PS | 0.0 | 0.2 | 95 | 10 to 20 | 0.3 | 0.0 | 0.0 | and a negative electrode containing a negative active material into/from which lithium ion is inserted/extracted at 1.2 V or higher potential than lithium potential, wherein a vinylene carbonate-containing nonaqueous electrolyte is used and at a time of initial charge-discharge, a negative electrode potential is lowered to less than 0.4 V relative to lithium potential to form a coat on the negative electrode surface.

2. The method for manufacturing a nonaqueous electrolytic cell according to claim 1, wherein the negative electrode potential is lowered to less than 0.4 V relative to lithium potential by making a charge voltage at the time of initial charge-discharge higher than that in use.

3. The method for manufacturing a nonaqueous electrolytic cell according to claim 2, wherein even in a region where the negative electrode potential is to less than 0.4 V relative to lithium potential, the positive electrode potential does not exceed 4.5 V to the lithium potential in an entire region where the negative electrode potential is to less than 0.4 V.

4. The method for manufacturing a nonaqueous electrolytic cell according to claim 1; wherein the nonaqueous electrolyte further containing 1,3-propane sultone is used at the time of initial charge-discharge.

5. The method for manufacturing a nonaqueous electrolytic cell according to claim 1, wherein the nonaqueous solvent contains a cyclic carbonate other than vinylene carbonate and a linear carbonate.

6. The method for manufacturing a nonaqueous electrolytic cell according to claim 5, wherein the cyclic carbonate is propylene carbonate and the linear carbonate is diethyl carbonate.

7. The method for manufacturing a nonaqueous electrolytic cell according to claim 1, wherein a content of the vinylene carbonate is 10% by weight or less to that of the nonaqueous electrolyte.

8. The method for manufacturing a nonaqueous electrolytic cell according to claim 7, wherein the content of the vinylene carbonate is 0.5 to 5% by weight to that of the nonaqueous electrolyte.

9. The method for manufacturing a nonaqueous electrolytic cell according to claim 1, wherein a thickness of the coat of the negative electrode surface is 10 nm or more.

10. The method for manufacturing a nonaqueous electrolytic cell according to claim 1, wherein the negative active material is a spinel type lithium titanate.

11. The method of using an electrolytic cell of claim 1, comprising:
preparing a nonaqueous electrolytic cell comprising a nonaqueous electrolyte containing an electrolyte salt and a nonaqueous solvent, a positive electrode, and a negative electrode containing a negative active material into/from which lithium ion is inserted/extracted at 1.2 V or higher potential than lithium potential, wherein the nonaqueous electrolyte contains vinylene carbonate, and the negative electrode has a coat on a surface thereof, and
using the nonaqueous electrolytic cell in a range of a negative electrode potential nobler than lithium potential by 0.8 V.

12. The method of using the nonaqueous electrolytic cell according to claim 11, wherein a positive active material is a lithium-transition metal composite oxide defined by a general formula $LiMn_xNi_yCo_zO_2$ (x+y+z=1; $0 \leq x \leq 0.5$; $0 \leq y \leq 1$; $0 \leq z \leq 1$).

13. The method of using the nonaqueous electrolytic cell according to claim 11, wherein a current collector of the negative electrode is of copper, nickel, or their alloy.

14. The method of using the nonaqueous electrolytic cell according to claim 11, wherein in an internal gas in the nonaqueous electrolytic cell after the cell is left at 60° C. for 2 weeks, a ratio of a total volume of methane, ethylene, and ethane to a total volume of hydrogen, carbon dioxide, methane, ethylene, and ethane is less than 0.3%, and a ratio of a carbon dioxide volume to a cell capacity is less than 0.4 µl/mAh.

\* \* \* \* \*